US009522658B2

(12) United States Patent
Reynolds et al.

(10) Patent No.: US 9,522,658 B2
(45) Date of Patent: Dec. 20, 2016

(54) VEHICLE ROLLBACK CONTROL APPARATUS AND METHOD

(71) Applicant: JAGUAR LAND ROVER LIMITED, Warwickshire (GB)

(72) Inventors: Tim Reynolds, Coventry (GB); Craig Percy, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 0 days.

(21) Appl. No.: 14/371,200

(22) PCT Filed: Jan. 9, 2013

(86) PCT No.: PCT/EP2013/050251
§ 371 (c)(1),
(2) Date: Jul. 9, 2014

(87) PCT Pub. No.: WO2013/104641
PCT Pub. Date: Jul. 18, 2013

(65) Prior Publication Data
US 2015/0031504 A1    Jan. 29, 2015

(30) Foreign Application Priority Data
Jan. 9, 2012    (GB) .................................. 1200279.6

(51) Int. Cl.
*B60W 30/18*    (2012.01)
*B60W 10/06*    (2006.01)
(Continued)

(52) U.S. Cl.
CPC ................ *B60T 8/32* (2013.01); *B60W 10/02* (2013.01); *B60W 10/06* (2013.01); *B60W 10/11* (2013.01);
(Continued)

(58) Field of Classification Search
CPC .................... B60W 2510/18; B60W 2710/186
See application file for complete search history.

(56) References Cited

U.S. PATENT DOCUMENTS 6,135,920 A * 10/2000 Kamiya ................ B60W 10/18
477/185
6,155,956 A    12/2000 Hayashi
(Continued)

FOREIGN PATENT DOCUMENTS

| CN | 102060011 A | 5/2011 |
|---|---|---|
| DE | 102008035778 A1 | 2/2009 |

(Continued)

OTHER PUBLICATIONS

International Search Report for International application No. PCT/EP2013/050251 dated May 10, 2013.
(Continued)

*Primary Examiner* — Ramya Burgess
*Assistant Examiner* — David Morris
(74) *Attorney, Agent, or Firm* — Carlson, Gaskey & Olds (57) ABSTRACT

A control system for a vehicle includes a powertrain comprising a prime mover and a driveline. The control system selectively controls the driveline to assume a first state in which a transmission of the driveline is substantially fully connected to the prime mover and a second state in which when the vehicle is stationary the transmission is at least partially disconnected or decoupled from the prime mover to reduce a torque loading on the prime mover. The control system controls the driveline to assume the second state when the vehicle is held stationary by a brake in response to actuation of a driver operable brake control. Upon release of the brake control, the control system verifies that a first portion of a powertrain of the vehicle is rotating at a speed exceeding a prescribed threshold and commands the driv-
(Continued)

eline to assume the first state before permitting release of the brake.

31 Claims, 2 Drawing Sheets

(51) Int. Cl.
*B60W 10/02* (2006.01)
*B60W 10/184* (2012.01)
*B60T 8/32* (2006.01)
*B60W 10/11* (2012.01)

(52) U.S. Cl.
CPC ...... *B60W 10/184* (2013.01); *B60W 30/18027* (2013.01); *B60W 30/18118* (2013.01); *B60W 2510/0638* (2013.01); *B60W 2510/104* (2013.01); *B60W 2510/18* (2013.01); *B60W 2540/12* (2013.01); *B60W 2710/021* (2013.01); *B60W 2710/1005* (2013.01); *B60W 2710/186* (2013.01); *Y02T 10/7258* (2013.01); *Y10T 477/646* (2015.01)

(56) References Cited

U.S. PATENT DOCUMENTS

| | | | |
|---|---|---|---|
| 6,434,475 B2* | 8/2002 | Kaneko | 123/179.4 |
| 7,226,389 B2* | 6/2007 | Steen | B60T 7/122 477/195 |
| 7,444,221 B2 | 10/2008 | Yamada et al. | |
| 8,849,534 B2 | 9/2014 | Saito | |
| 2002/0086772 A1* | 7/2002 | Abe | B60T 7/122 477/102 |
| 2003/0214186 A1* | 11/2003 | Kinder | B60T 7/122 303/192 |
| 2004/0012250 A1* | 1/2004 | Kuno | B60T 7/122 303/20 |
| 2005/0140208 A1* | 6/2005 | Ji | B60T 7/122 303/192 |
| 2006/0183600 A1 | 8/2006 | Kamikado | |
| 2011/0065548 A1 | 3/2011 | Yu et al. | |
| 2011/0136625 A1* | 6/2011 | Yu | B60W 10/06 477/185 |

FOREIGN PATENT DOCUMENTS

| | | |
|---|---|---|
| EP | 0786368 A2 | 7/1997 |
| EP | 1995144 A1 | 11/2008 |
| EP | 2169252 A1 | 3/2010 |
| GB | 2482862 A | 2/2012 |
| JP | 2004082996 A | 3/2004 |
| JP | 2010-084830 A | 4/2010 |

OTHER PUBLICATIONS

Search Report for Application No. GB1200279.6 dated May 9, 2012.
Combined Search and Examination Report under Sections 17 and 18(3) for Application No. GB1300326.4, dated Jun. 21, 2013.
Search Report for Chinese Application No. 201380004999.0 dated Feb. 15, 2016.

* cited by examiner

VEHICLE ROLLBACK CONTROL APPARATUS AND METHOD

FIELD OF THE INVENTION

The present invention relates to motor vehicles and to a method of controlling a motor vehicle. Particularly, but not exclusively, the invention relates to a vehicle rollback control apparatus and method. Aspects of the invention relate to an apparatus, to a method and to a vehicle.

BACKGROUND

It is known to provide a motor vehicle having an automatic transmission and transmission idle control (TIC) functionality. The vehicle is operable automatically to disengage an engine of the vehicle from the transmission by means of a clutch when the vehicle is stopped. This feature reduces a torque loading on the engine when the vehicle is at rest and the transmission is not in a park or neutral mode.

It is also known to provide a motor vehicle having stop/start functionality in which an engine of the vehicle is switched off to save fuel when conditions permit such as when the vehicle is held stationary with a driver-operated brake pedal depressed. When the driver releases the brake pedal the engine is restarted and a driveline of the vehicle is driven by the engine via a transmission.

It is an aim of embodiments of the invention to provide improved motor vehicle control functionality.

STATEMENT OF THE INVENTION

Aspects of the invention provide a control system, a vehicle and a method as claimed in the appended claims.

In an aspect of the invention for which protection is sought there is provided a control system for a vehicle, the vehicle having a powertrain comprising a prime mover and a driveline, the control system being configured selectively to control the driveline to assume a first state in which a transmission of the driveline is substantially fully connected to the prime mover and a second state in which the transmission is at least partially disconnected or decoupled from the prime mover when the vehicle is stationary thereby to reduce a torque loading on the prime mover. The control system controls the driveline to assume the second state when the vehicle is held stationary by brake means in response to actuation of driver operable brake control means the control system, upon release of the brake control means, verifies that a first portion of a powertrain of the vehicle is rotating at a speed exceeding a prescribed threshold and to command the driveline to assume the first state before permitting release of the brake means.

The control system may be configured wherein if the first portion of the powertrain of the vehicle is not rotating at a speed exceeding the prescribed threshold within a prescribed period of time after release of the brake control means the control system is configured automatically to assume a failed start state in which the vehicle continues to be held stationary.

The prescribed period may be any suitable period, for example a period of around 2 s. Other values are also useful.

Optionally, in the failed start state the control system continues to hold the vehicle stationary at least in part by means of the brake means.

Further optionally, in the failed start state the control system continues to hold the vehicle stationary at least in part by parking brake means.

Optionally, in the failed start state the control system continues to hold the vehicle stationary at least in part by controlling the transmission to assume a park mode.

The control system may be configured to control the driveline to assume the first state when the brake control means is released and the further condition is met that an amount of torque demanded of the powertrain is greater than a threshold value.

The control system may be configured to control the driveline to assume the first state in the event an amount of torque demanded of the powertrain is above a threshold value whilst the vehicle is being held stationary by the brake means before the driver releases the brake control means.

This feature allows the control system to accommodate a situation in which the driver wishes to pre-load the driveline with drive torque before releasing the brake means. This feature may be particularly useful in certain off-road scenarios in which the driver seeks to drive the vehicle up a particularly severe gradient.

Optionally, the amount of torque demanded of the powertrain is controlled in dependence on one selected from amongst a position of a driver-operated accelerator control and an output provided by the control system substantially independently of the position of the driver accelerator control, optionally an output of a vehicle speed control or automatic progress control system.

The control system may be operable wherein release of the brake control means is identified by reference to an amount of pressure applied to a foot pedal of the vehicle.

Advantageously the control system may be operable wherein release of the brake control means is identified by a reduction in an amount of pressure applied to a foot pedal of the vehicle substantially to zero.

The control system may be operable to control the driveline to assume the first state by substantially fully closing clutch means and to control the driveline to assume the second state by at least partially opening the clutch means.

In the case the second state is a state in which the clutch means is partially open, the clutch means may therefore be arranged to experience slip if the prime mover remains switched on.

In some embodiments in the control system may control the driveline to assume the second state by substantially fully opening the clutch means. This feature has the advantage that an amount of slip of the clutch means may be reduced substantially to zero.

Advantageously the control system may be operable to generate a driveline state output indicative of whether the driveline is in the first state, the control system being operable to verify that the driveline is in the first state by reference to the driveline state output.

The control system may be operable to release the brake means upon verification by the system that the conditions are met that a first portion of a powertrain of the vehicle is rotating at a speed exceeding a prescribed threshold and that the driveline is in the first state, verification that the driveline is in the first state being made by reference to the driveline state output.

The driveline state output may be arranged to be set in dependence on a state of the clutch means.

The state of the clutch means may be determined by reference to one selected from amongst an amount of hydraulic fluid pressure applied to close the clutch means and an amount of electrical current drawn by the clutch means when the clutch means is closed.

Other means may also be employed to determine the state of the clutch means. In some embodiments, the control system assumes that the clutch means is functioning correctly and that the clutch means will close when commanded unless a fault signal indicates that a malfunction associated with the clutch.

The driveline state output may be provided in the form of a signal.

The state output signal may for example be provided in the form of a logic state of an output line, a serial data output from an output line or any other suitable signal.

The output may be provided in the form of a value of a variable or a state of a flag stored in a memory of the system.

It is to be understood that in some embodiments the driveline may be operable to assume a state other than the first or second states. For example the second state may correspond to partial opening of a clutch operable to isolate the transmission from the prime mover, the clutch being operable to assume a further state being a substantially fully open state.

The control system may be configured to verify that a first portion of a powertrain of the vehicle is rotating at a speed exceeding a prescribed threshold by verifying that a drive portion of the prime mover is rotating at a speed exceeding the prescribed threshold.

The control system may be operable to determine that the drive portion of the prime mover is rotating by reference to a speed of rotation of a component to which the drive portion of the prime mover is connected.

The control system may be operable to determine that the drive portion of the prime mover is rotating by reference to a speed of rotation of an input portion of the clutch means.

The control system may be operable to release the brake means when the further condition is met that the driveline is verified to be in the first state.

The control system may be operable to control the vehicle to assume a failed move state in which brake means of the vehicle is applied in order to stop movement of the vehicle if the driver releases the brake control means and a speed of the vehicle does not exceed a prescribed value within a prescribed period of the driver releasing the brake control means.

The control system may be operable to determine that the brake control means has been released when the amount of brake torque demanded by in response to application of the brake control means is below a prescribed value.

The prescribed value of brake torque demanded by the brake control means may correspond to an amount of brake torque required to maintain the vehicle substantially stationary.

In a further aspect of the invention for which protection is sought there is provided a vehicle comprising a control system according to a preceding aspect.

The driver-operated brake control means may comprise a foot pedal operable to apply the brake means when pressure is applied to the foot pedal.

The driver-operated accelerator control may comprise a foot pedal.

The prime mover may comprise an engine.

The prime mover may comprise an electric motor.

The prime mover may comprise an engine and an electric motor.

The transmission may comprise the clutch means.

In a still further aspect of the invention for which protection is sought there is provided a method of controlling a motor vehicle by means of a control system, the vehicle having a powertrain comprising a prime mover and a driveline, the method comprising selectively controlling the driveline to assume a first state in which a transmission of the driveline is substantially fully connected to the prime mover and a second state in which the transmission is at least partially disconnected or decoupled from the prime mover thereby to reduce a torque loading on the prime mover when the vehicle is stationary, the method comprising controlling the driveline to assume the second state when the vehicle is held stationary by brake means by actuation of driver operable brake control means, the method comprising, upon release of the brake control means, maintaining the vehicle stationary by the brake means and controlling the driveline to assume the first state, the method further comprising verifying that a first portion of a powertrain of the vehicle is rotating at a speed exceeding a prescribed threshold after release of the brake control means before permitting release of the brake means.

The step of maintaining the vehicle stationary by the brake means and controlling the driveline to assume the first state upon release of the brake control means may comprise maintaining the vehicle stationary by the brake means and controlling the driveline to assume the first state upon release of driver operable brake control means.

According to another aspect of the invention there is provided a control system for a vehicle, the vehicle having a powertrain comprising a prime mover and a driveline, the control system being configured selectively to control the driveline to assume a first state in which a transmission of the driveline is substantially fully connected to the prime mover and a second state in which when the vehicle is stationary the transmission is at least partially disconnected or decoupled from the prime mover thereby to reduce a torque loading on the prime mover, the control system being configured to control the driveline to assume the second state when the vehicle is held stationary by brake means in response to the presence of a brake application signal, the control system being operable when the brake application signal is no longer present to verify that a first portion of a powertrain of the vehicle is rotating at a speed exceeding a prescribed threshold and to command the driveline to assume the first state before permitting release of the brake means.

The brake application signal may be generated by a driver, by means of a foot pedal. Alternatively the brake application signal may be generated by a control system, for example a vehicle speed control system.

According to one aspect of the invention for which protection is sought there is provided a motor vehicle comprising a powertrain, the powertrain comprising: actuator means operable to provide torque to drive the vehicle; transmission means arranged to transmit power from the actuator means to a driveline of the powertrain; and releasable torque transmitting means operable between open and closed states thereby releasably to prevent or to allow torque to be transmitted between the actuator means and the transmission means, wherein the vehicle is operable automatically to assume an actuator-released state in which the actuator means is disconnected from the transmission means by means of an actuator-release operation in which when the vehicle is held stationary by driver-operated brake means the releasable torque transmitting means is placed automatically in the open state, the vehicle being further operable automatically to assume an actuator-connected state by performing an actuator-connect operation in which the releasable torque transmitting means is placed in the closed state thereby to connect the actuator means to the transmission means, the actuator-connect operation being performed when the driver signals release of the brake means by means of a driver-operated brake means control, and wherein when the vehicle is in the actuator-released state and the driver signals release of the brake means, the vehicle is configured to assume the actuator-connected state and to verify that the releasable torque transmitting means is in the closed state, wherein if the releasable torque transmitting means is verified by the vehicle to be in the closed state the vehicle is configured automatically to release the brake means.

According to another aspect of the invention for which protection is sought there is provided a control system for a vehicle having a prime mover, a transmission for selectively connecting or coupling the prime mover to at least one wheel, brake means and a driver operable brake control means for operating the brake means, and control means configured to disconnect or de-couple the transmission from the prime mover when the vehicle is held stationary by the brake means in response to operation of the brake control means and to connect or couple the transmission to the prime mover upon release of the brake control means by the driver, the system comprising a controller arranged to: maintain the vehicle stationary by the brake means upon release of the brake control means by the driver; and release the brake means upon verification that the transmission is connected or coupled to the prime mover.

Embodiments of the present invention have the advantage that when a driver signals release of the brake means the vehicle prevents the brake means from being released until the vehicle has verified that the releasable torque transmitting means is in the closed state, and therefore that the actuator means is connected to the one or more wheels thereby preventing rollback of the vehicle. The vehicle may verify the state of the releasable torque transmitting means responsive to a signal indicative of the state.

The feature that the vehicle is arranged to open the releasable torque transmitting means (which may comprise a clutch and/or a torque converter by way of example) whilst the vehicle is stationary has the advantage that slippage of the transmission means or releasable torque transmitting means may be prevented. That is, whilst the actuator means is rotating slippage of the releasable torque transmitting means may be prevented. This has the advantage that an amount of torque loading on the actuator means when the vehicle is stationary is reduced. This in turn has the advantage that an amount of energy consumed by the actuator means may be reduced. Furthermore, losses due to slippage such as hydraulic fluid losses may be substantially reduced or eliminated.

Advantageously, if the releasable torque transmitting means fails to assume the closed state when the vehicle commands an actuator-connect operation the vehicle may be configured automatically to assume a failed start state in which the vehicle continues to be held stationary.

Further advantageously, in the failed start state the vehicle may continue to be held stationary by the brake means.

Optionally in the failed start state the vehicle continues to be held stationary by parking brake means of the vehicle.

Further optionally, in the failed start state the vehicle may continue to be held stationary by placing the transmission in a park mode.

Advantageously the vehicle may be operable automatically to stop and subsequently to restart the actuator means during a drivecycle thereby to reduce an amount of time for which the actuator means is rotating during a given drivecycle.

Advantageously the vehicle may be operable such that in the actuator-released state the actuator means does not rotate and wherein when the actuator-connect operation is performed the vehicle is configured to restart the actuator means.

It is to be understood that the actuator means may be restarted before the actuator-connect operation is performed. It is to be understood that in some arrangements it may not be possible or it may be undesirable to start the actuator means after the releasable torque transmitting means has assumed the closed state. For example, if the actuator means comprises an engine that must be cranked in order to be started, cranking whilst the engine is connected to transmission means in the form of an automatic transmission may cause damage to the transmission. This is because automatic transmissions typically require a transmission fluid pressure to be above a prescribed value in order to operate correctly. The transmission fluid is typically pressurised by means of an engine-driven hydraulic fluid pump and therefore the engine must be running in order for the transmission to operate correctly.

Further advantageously the vehicle may be operable to assume the actuator-released state when the condition is met that a driver-operated accelerator control demands an amount of torque that is less than a threshold value.

The threshold value may correspond substantially to a minimum amount of torque that the actuator means may develop.

Advantageously the vehicle may be configured to perform the actuator-connect operation in the event the driver-operated accelerator control demands an amount of torque above a threshold value whilst the vehicle is being held stationary by the driver operated brake means before the driver signals release of the brake means.

It is to be understood that a situation in which the driver maintains the vehicle stationary with the driver-operated brake means and the accelerator control in the first configuration and subsequently causes the driver-operated accelerator control to assume the second configuration whilst continuing to hold the vehicle stationary with the driver-operated brake means may arise when a driver requires a greater amount of torque to be available to drive the vehicle when the driver-operated brake means is released. That is, when the driver requires a greater amount of torque than would otherwise be available if the driver operated accelerator control were in the first configuration when the brake means is released.

This feature allows the driver to 'pre-load' the driveline with torque from the actuator means before the vehicle actually moves forward. This procedure might be performed for example if the driver is in the eco-stop state on an incline and the driver wishes to climb the incline. For example the incline may be a relatively steep incline and/or the vehicle may be carrying or towing a relatively high payload.

In some circumstances this procedure might be performed if the driver wishes to accelerate the vehicle from standstill at a relatively high rate of acceleration when the vehicle has been held in the eco-stop state.

Optionally the driver-operated accelerator control comprises a foot pedal.

The vehicle may be operable to assume the actuator-released state when the further condition is met that an automatic vehicle accelerator controller is providing a torque demand to the actuator means and the amount of torque demanded is less than a threshold value.

The automatic vehicle accelerator controller may be part of a cruise control system, a terrain response control system and/or any other suitable system.

A suitable terrain response control system is described in U.S. Pat. No. 7,349,776, the contents of which are expressly incorporated by reference herein.

Advantageously the vehicle may be configured to perform the actuator-connect operation in the event that the automatic vehicle accelerator controller demands an amount of torque from the actuator means that is above a threshold value before the driver signals release of the brake means.

Advantageously, the driver-operated brake means control may comprise a foot pedal operable to apply the brake means when pressure is applied to the foot pedal.

The vehicle may be arranged to allow the driver to signal release of the brake means by releasing pressure that has been applied to the foot pedal.

The vehicle may be operable to allow the driver to signal release of the brake means by releasing pressure on the foot pedal substantially to zero.

Advantageously the vehicle may be further configured to check that a torque input shaft of the releasable torque transmitting means is rotating in addition to checking that the releasable torque transmitting means is in the closed state before releasing the brake means.

This feature has the further advantage that the vehicle may determine that the actuator means is operating correctly (thereby rotating the input shaft of the releasable torque transmitting means) and therefore able to propel the vehicle before releasing the brake means.

Further advantageously the vehicle may include control means operable to provide a releasable torque transmitting means state signal indicative of a current state of the releasable torque transmitting means.

This feature has the advantage that when the driver signals release of the brake means the vehicle can ensure that the releasable torque transmitting means is in the closed state by reference to the releasable torque transmitting means state signal. That is, unless the state signal indicates that the releasable torque transmitting means is closed, the brake means cannot be released when the driver signals release of the brake means. Thus a risk of vehicle rollaway may be reduced.

The state signal may be provided by a transmission idle controller (TIC) module operable to control the releasable torque transmitting means to assume the open or closed states.

Advantageously the vehicle may be configured to assume a failed move state in which brake means of the vehicle is applied in order to stop the vehicle if the driver signals release of the brake means and a speed of the vehicle does not exceed a prescribed value within a prescribed period of the driver signaling release of the brake means.

This feature has the advantage that if a fault has occurred that is preventing the vehicle from moving under the control of the actuator means the vehicle applies the brake means.

Advantageously the actuator means may comprise an engine and/or an electric motor.

Thus the vehicle may be a hybrid electric vehicle (HEV). The releasable torque transmitting means may be arranged releasably to connect the engine to the electric machine.

According to another aspect of the invention for which protection is sought there is provided a method of controlling a motor vehicle comprising a powertrain having actuator means by which the powertrain is operable to provide torque to drive the vehicle and transmission means whereby power is transmitted from the actuator means to a driveline of the powertrain, the actuator means being releasably connectable to the transmission means by a releasable torque transmitting means, the method comprising: commanding automatically by control means an actuator-release operation whereby when the vehicle is being held stationary by the driver-operated brake means the releasable torque transmitting means is placed in an open state whereby the actuator means is not connected to the transmission means and the vehicle assumes an actuator-released state; when the driver subsequently signals release of the brake means by means of a driver-operated brake means control, the method comprising commanding automatically by the control means an actuator-connect operation in which the releasable torque transmitting means is placed in a closed state and the vehicle assumes an actuator-connected state, the method comprising the step of subsequently verifying that the releasable torque transmitting means is in the closed state, if the releasable torque transmitting means is in the closed state the method further comprising releasing the brake means.

It is to be understood that the actuator-release operation may be performed before the vehicle becomes stationary and is held stationary by the brake means, or after the vehicle has become stationary.

Advantageously the method may comprise the step of controlling the vehicle automatically to assume a failed start state in which the vehicle continues to be held stationary if the releasable torque transmitting means fails to assume the closed state after the actuator-connect operation is commanded.

The vehicle may be controlled automatically to assume the failed start state if the releasable torque transmitting means fails to assume the closed state within a prescribed time period of the actuator-connect operation being commanded.

The step of continuing to hold the vehicle stationary in the failed start state may comprise the step of continuing to hold the vehicle stationary by means of the brake means.

Optionally the step of continuing to hold the vehicle stationary in the failed start state comprises the step of continuing to hold the vehicle stationary by means of the parking brake means.

Further optionally the step of continuing to hold the vehicle stationary in the failed start state comprises the step of placing the transmission means in a park mode.

Other means for controlling the vehicle to remain stationary are also useful.

Advantageously the method may comprise the step of stopping automatically the actuator means during a drivecycle and subsequently restarting automatically the actuator means thereby to reduce an amount of time for which the actuator means is rotating during a given drivecycle.

Further advantageously when the vehicle is in the actuator-released state the actuator means may be stopped and the step of performing the actuator-connect operation may comprise the step of restarting the actuator means.

Thus the vehicle may be operable to perform an 'eco-stop' operation in which the actuator means (which may be an engine) is stopped in order to save fuel during the course of a drive cycle. The engine may be stopped after the engine has been disconnected from the transmission means. Subsequently an 'eco-start' operation may be performed in which the actuator means is restarted and the actuator means reconnected to the transmission means.

According to a further aspect of the invention for which protection is sought there is provided a method of controlling a motor vehicle comprising a powertrain having actuator means by means of which the powertrain is operable to provide torque to drive one or more wheels of the vehicle, the method comprising controlling the vehicle automatically to assume an eco-stop state in which a flowpath of torque from the actuator means through the powertrain is interrupted and the actuator means is switched off in order to reduce fuel consumption, the method further comprising holding the vehicle stationary in the eco-stop state by means of driver operated brake means and controlling the vehicle to perform an eco-start operation whereby the flow path of torque through the powertrain from the actuator means to the one or more wheels is restored, the method comprising performing the eco-start operation when the driver signals release of the brake means, the method further comprising ensuring that the flowpath of torque through the powertrain from the actuator means to the one or more wheels is restored before releasing the brake means.

Advantageously the step of interrupting the flowpath of torque may comprise actuating releasable torque transmitting means from a closed state to an open state.

According to a still further aspect of the invention for which protection is sought there is provided a method of operating a vehicle comprising: disconnecting a prime mover from a transmission of the vehicle upon the vehicle becoming stationary following operation of vehicle brakes; connecting the prime mover to the transmission upon release of a driver operable brake control means; maintaining the vehicle stationary using the brakes upon release of the brake control means by the driver; and releasing the brakes upon verification that the transmission is connected to the prime mover.

In one aspect of the invention for which protection is sought there is provided a control system for a vehicle, the vehicle having a powertrain comprising a prime mover and a driveline, the control system being configured selectively to control the driveline to assume a first state in which a transmission of the driveline is substantially fully connected to the prime mover and a second state in which the transmission is at least partially disconnected or decoupled from the prime mover thereby to reduce a torque loading on the prime mover when the vehicle is stationary, the control system being configured to control the driveline to assume the second state when the vehicle is held stationary by brake means in response to operation of driver operable brake control means, the control system being operable upon release of the brake control means to maintain the vehicle stationary by the brake means and to control the driveline to assume the first state, the control system being further operable to release the brake means upon verification by the system that the driveline is in the first state.

The control system may be configured wherein if the driveline fails to assume the first state when the brake control means is released the control system is configured automatically to assume a failed start state in which the vehicle continues to be held stationary.

In a further aspect of the invention for which protection is sought there is provided a method of controlling a motor vehicle by means of a control system, the vehicle having a powertrain comprising a prime mover and a driveline, the method comprising selectively controlling the driveline to assume a first state in which a transmission of the driveline is substantially fully connected to the prime mover and a second state in which the transmission is at least partially disconnected or decoupled from the prime mover thereby to reduce a torque loading on the prime mover when the vehicle is stationary, the method comprising controlling the driveline to assume the second state when the vehicle is held stationary by brake means in response to operation of driver operable brake control means, the method comprising, upon release of the brake control means, maintaining the vehicle stationary by the brake means controlling the driveline to assume the first state, the method further comprising verifying that the driveline is in the first state, the method further comprising releasing the brake means upon verifying that the driveline is in the first state.

Within the scope of this application it is expressly intended that the various aspects, embodiments, examples and alternatives set out in the preceding paragraphs, in the claims and/or in the following description and drawings, and in particular the individual features thereof, may be taken independently or in any combination. For example features disclosed in connection with one embodiment are applicable to all embodiments unless such features are incompatible.

BRIEF DESCRIPTION OF THE DRAWINGS

Embodiments of the invention will now be described, by way of example only, with reference to the accompanying figures in which.

DETAILED DESCRIPTION

Figure 1:
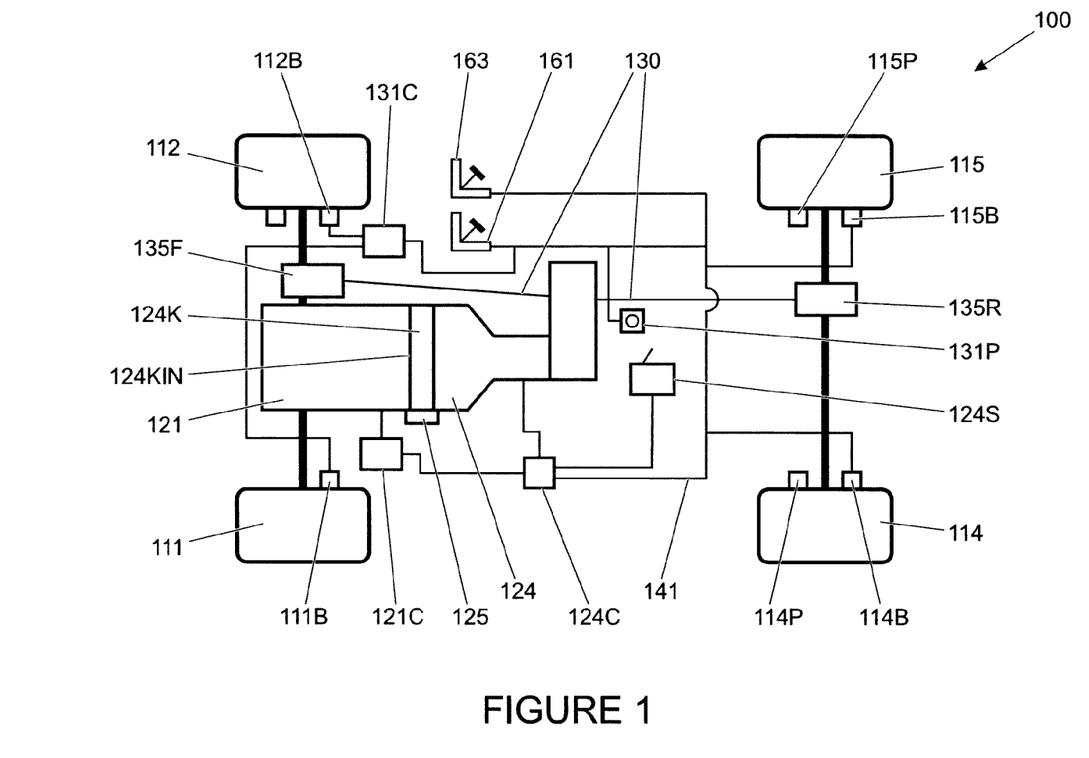
FIG. 1 is a schematic illustration of a vehicle 100 according to an embodiment of the present invention.

FIG. 1 shows a vehicle 100 according to an embodiment of the present invention. The vehicle 100 has an engine 121 arranged to drive an automatic transmission 124 which is arranged to be releasably coupled to a driveshaft 130 of the vehicle 100 by means of a transmission clutch 124K.

The driveshaft 130 drives a pair of front wheels 111, 112 via a front differential 135F and a pair of rear wheels 114, 115 via a rear differential 135R.

The vehicle 100 has an engine controller 121C arranged to control the engine 121 and a transmission controller 124C arranged to control the transmission 124 including the transmission clutch 124K. A driver-operated accelerator pedal 163 is provided by means of which the driver may demand a required amount of torque from the engine 121.

Each of the wheels 111, 112, 114, 115 has a respective disc brake 111B, 112B, 114B, 115B operable by a brake controller 131C responsive to a signal from a driver operated brake pedal 161. The disc brakes 111B, 112B, 114B, 115B are arranged to decelerate the vehicle 100 when the vehicle 100 is moving and to hold the vehicle 100 stationary when required.

The rear wheels 114, 115 of the vehicle are also provided with a respective driver operated parking brake 114P, 115P each in the form of a drum brake although other arrangements are also useful. In some embodiments, one or more disc brakes 111B, 112B, 114B, 115B may be operable to provide parking brake functionality instead of a drum brake. The parking brakes 114P, 115P are operable to be applied and released by the brake controller 131C responsive to a signal received from a driver-operated parking brake actuator 131P in the form of a push-button actuator.

The engine controller 121C, brake controller 131C and transmission controller 124C are arranged to communicate with one another and with other signaling devices such as the pedals 161, 163, transmission selector 124S and parking brake actuator 131P by means of a controller area network (CAN) bus 141.

A transmission selector 124S is coupled to the transmission controller 124C. The selector 124S is operable by the driver to select a required transmission operating mode.

In the embodiment of FIG. 1 the transmission operating modes are: (1) a park mode in which the transmission 124 is disconnected from the engine 121 and a park mode pawl device 125 is controlled to immobilize the transmission 124; (2) a reverse mode in which the transmission 124 is arranged to drive the vehicle in a reverse direction; (3) a neutral mode in which the transmission 124 is disengaged from the engine 121 but the park mode pawl device 125 is not controlled to immobilize the transmission 124; (4) a drive mode in which the transmission 124 is arranged to drive the vehicle in a forward direction; and (5) a sport mode in which the transmission 124 is arranged to drive the vehicle in the forward direction but in which the transmission controller 124C is reconfigured to allow a driver to obtain a higher level of performance from the vehicle 100 such as a higher rate of acceleration for a given throttle pedal position. In some embodiments in the sport mode a different set of gear shift maps are employed by the controller 124C compared with the drive mode. Optionally, one or more characteristics of a suspension of the vehicle 100 may also be changed responsive to selection of the sport or drive modes. For example a ride height of the vehicle 100 may be changed and/or a stiffness of the suspension changed responsive to the selected transmission mode.

It is to be understood that the vehicle 100 may control the transmission 124 by means of the transmission controller 124C automatically to assume the park mode when required.

The transmission controller 124C is also configured to implement a transmission idle control (TIC) function according to which the controller 124C controls the transmission clutch 124K to open when the vehicle 100 is stationary and the engine 121 is running. This feature prevents slippage of the transmission 124 when the vehicle is stationary thereby reducing an amount of torque loading on the engine 121. An amount of fuel consumed by the engine 121 is thereby reduced.

In the present embodiment the TIC function is implemented in software code by the transmission controller 124C and is configured to set a value of a variable in a memory of the transmission controller 124C indicative of a current state of the TIC function. The TIC function is arranged to assume one of four states S00, S01, S10, S11.

The first state S00 corresponds to a standby state in which the transmission controller 124C controls the transmission clutch 124K to assume the open state and is assumed when the transmission 124 is in the park or neutral mode.

The second state S01 corresponds to an active state in which the transmission controller 124C also controls the transmission clutch 124K to assume the open state. This mode may be assumed when the transmission 124 is in the drive, sport or reverse mode.

The third state S10 corresponds to an inactive or deactivating state in which the transmission controller 124C controls the transmission clutch 124K to assume the closed state. This mode may also be assumed when the transmission 124 is in the drive, sport or reverse modes. In the present embodiment the third state can only be assumed once the TIC function has verified that an input shaft 124KIN of clutch 124K is rotating at a speed exceeding a threshold speed.

The fourth state S11 corresponds to a fault state. When the TIC function assumes the fault state, the transmission controller 124C controls the transmission 124 automatically to assume the park mode. Again this mode may be assumed when the transmission 124 is in the drive, sport or reverse mode.

The TIC function of the transmission controller 124C will be discussed in more detail below.

In the present embodiment, the engine controller 121C is configured to implement a stop/start scheduler function being a function implemented in software code although some embodiments do not implement stop/start functionality. The stop/start scheduler function is configured to control the engine 121 to turn off when the vehicle 100 is held stationary by the driver by means of the brake pedal 161 in order to save fuel. A state of the vehicle 100 in which it is held stationary by the driver with the engine 121 stopped automatically according to the stop/start control methodology of the vehicle 100 may be described as an 'eco-stop' or 'eco-stopped' state.

In some embodiments one or more further criteria may be required to be met according to the stop/start control methodology in order for the vehicle 100 to assume the eco-stop state.

For example, the stop/start scheduler function may be configured to turn the engine 121 off when the vehicle has been held stationary by means of the brake pedal 161 for more than a prescribed time period such as a period of 5 seconds. Other arrangements are also useful.

If the vehicle 100 is in the eco-stop state and the driver releases the brake pedal 161, the disc brakes 111B-115B continue to be applied automatically by the vehicle 100 and the engine controller 121C commands the engine 121 to restart.

It is to be understood that the engine controller 121C is arranged to receive an input from the brake controller 131C. When the engine 121 has been stopped according to a command by the stop/start scheduler function, the brake controller 131C is arranged to trigger the engine controller 121C to restart the engine 121 when the brake pedal 161 is released.

Once the engine 121 has restarted, the transmission clutch 124K is closed and the disc brakes 111B-115B are released.

It is to be understood that the disc brakes 111B-115B continue automatically to be held by the brake controller 131C whilst the engine 121 is restarted in order to prevent the vehicle 100 from rolling under gravity before the engine 121 is restarted. Unintended movement of the vehicle under gravity may be referred to as 'rollaway' and includes both forward and backward movement of the vehicle 100. It is to be understood that the brake controller 131C continues to command the disc brakes 111B-115B to hold the vehicle 100 stationary until the TIC function indicates that the TIC function has assumed the third state S10.

If the engine 121 does not restart within a prescribed period (in some embodiments the prescribed period is a period of 2 s although other lengths of time are also useful) the transmission controller 124C controls the vehicle 100 to assume a failed start state in which the transmission controller 124C commands the transmission 124 to assume the park mode. In some embodiments the transmission controller 124C also commands the brake controller 131C to apply the parking brakes when the failed start state is assumed. Other arrangements are also useful.

In some embodiments, if the TIC function does not assume state 10 within a prescribed period of the driver releasing the brake pedal 161, the transmission controller 124C also controls the vehicle 100 to assume the failed start state.

Figure 2:
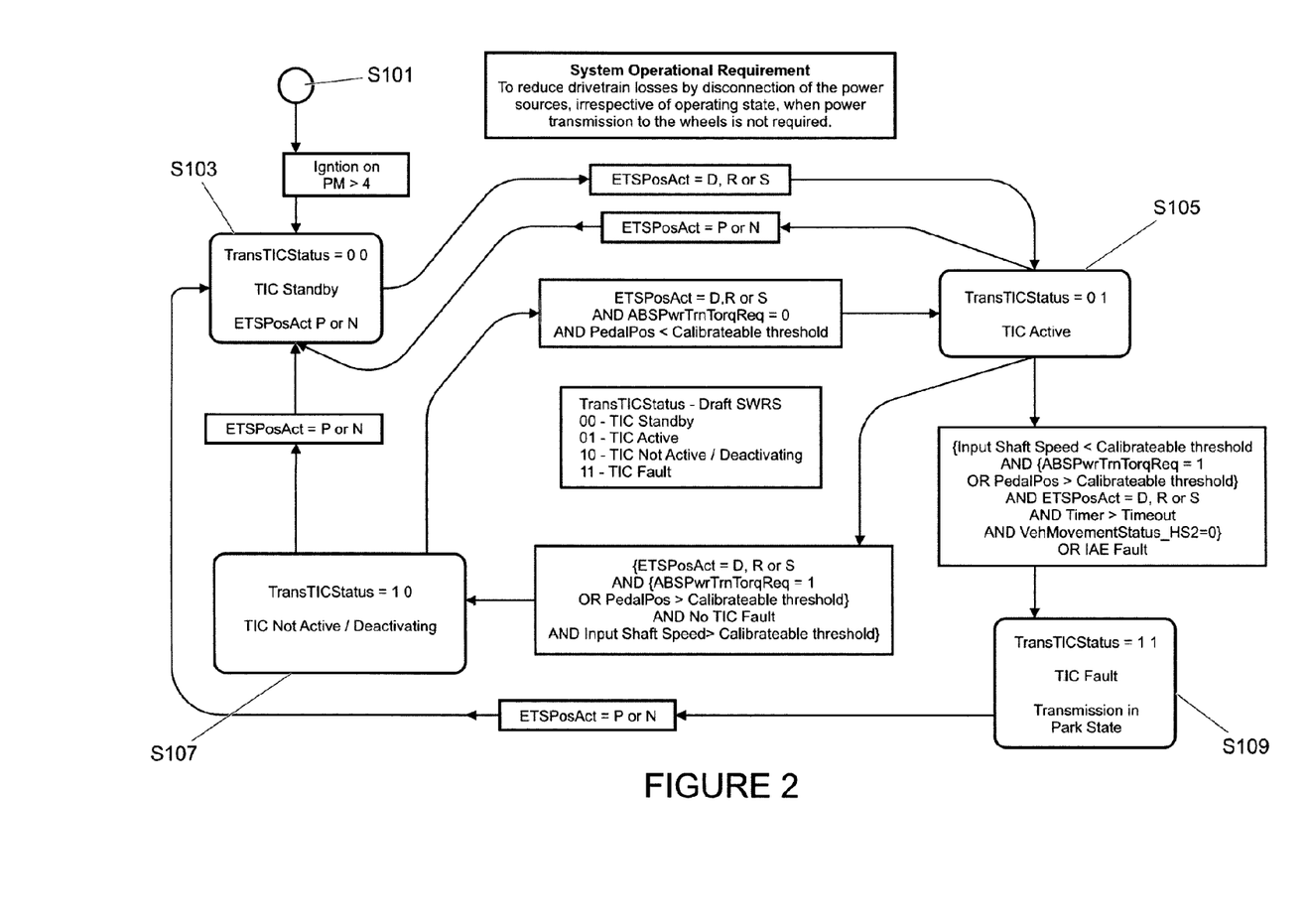
FIG. 2 is a schematic flow diagram of a mode of operation of a vehicle according to an embodiment of the invention.

FIG. 2 is a schematic flow diagram illustrating in more detail a manner in which operation of the engine 121 and transmission 124 is controlled in dependence on the state of the TIC function, the selected mode of the transmission 124 according to the transmission selector 124S and a state of the brake and accelerator pedals 161, 163.

Operation of the vehicle 100 will be described starting with the vehicle 100 in a parked state (state S101, FIG. 2) with the engine 121 turned off (and not in the eco-stop state). With the vehicle 100 in the parked state S101 the driver may control the vehicle 100 by means of a start key or other start device to assume a 'ready' state in which the vehicle 100 is ready to be driven. It is to be understood that a vehicle controller may be configured to broadcast a power mode signal being a signal indicating a power mode of the vehicle at a given moment in time, being one of a plurality of modes the vehicle 100 may assume at a given moment. The ready state may correspond to a value of power mode greater than a prescribed value in some arrangements. In the embodiment shown the ready state corresponds to a value of power mode PM that is greater than 4.

In non-hybrid vehicles not having stop/start functionality the ready state may be a state in which the engine 121 is running. In vehicles having stop/start functionality this may be a state in which either the engine 121 is running or the engine controller 121C is ready to crank the engine 121 when the driver releases the brake pedal 161. In some vehicles having stop/start functionality this may be a state in which the engine controller 121C is ready to crank the engine 121 when the driver releases the brake pedal 161 and depresses the accelerator pedal 163.

In hybrid vehicles the ready state may correspond to a state in which a powertrain controller is ready to demand drive torque of an electric machine and/or an engine 121. Other arrangements are also useful.

It is to be understood that by the term start device is included any means by which a driver may configure the vehicle 100 to allow the engine 121 to be started and driven, such as a radio frequency identification (RFID) device, BLUETOOTH™ device or any other suitable device.

As described above, if the driver places the vehicle in the 'ready' state by means of the start device the driver may select any required mode of operation of the transmission 124. In order for the vehicle 100 to transition from the parked state S101 to the ready state S103 the transmission selector 124S must be set to select the park or neutral modes. In some embodiments the transmission 124 is configured automatically to assume the park mode when the vehicle 100 is in the parked state S101.

In a vehicle 100 according to the present embodiment, the transmission selector 124S is a soft-key selector, i.e. a selector 124S that may be set automatically by the transmission controller 124C to correspond to a required operating mode of the transmission 124 such as the park mode without the driver being required physically to touch the selector 124S, for example in order to move a lever or rotate a knob.

With the vehicle in the ready state S103 the stop/start scheduler function may require the engine 121 to start even if the driver has not provided an indication that drive torque is required either immediately or imminently. For example, if the driver has selected a vehicle function such as a climate control function requiring operation of the engine 121 the engine 121 may be started. In some embodiments the stop/start scheduler may command the engine 121 to start in such circumstances. In some embodiments another controller such as a climate control controller may override a signal from the stop/start scheduler to maintain the engine 121 in a stopped state and command starting of the engine 121.

In some embodiments the engine 121 may be switched on automatically by the stop/start scheduler function whenever the vehicle 100 transitions from the parked state S101 to the ready state S103. Other arrangements are also useful.

If the engine 121 remains switched off, the transmission controller 124C sets the TIC function to the standby state S00. If the driver subsequently selects the drive, reverse or sport mode the vehicle 100 assumes state S105. In state S105 the stop/start scheduler function implemented by the engine controller 121C commands the engine 121 to be started and the TIC function is set to the active state S01 in which the clutch 124K remains open and the engine 121 is controlled by the engine controller 121C to run at an idle speed.

In state S105 the transmission controller 124C monitors a speed of rotation of an input shaft 124KIN of the transmission clutch 124K (by means of a clutch input shaft speed signal Input_Shaft_Speed), a position of the accelerator pedal 163 (by means of a pedal position signal PedalPos) and a powertrain torque request signal ABSPwrTrnTorqReq. The signal ABSPwrTrnTorqReq is a signal that is determined by the brake controller 131C. The signal is set to a value of 1 when braking effort applied by the brake controller 131C in response to depression of the brake pedal 161 by the driver has reduced to a level where powertrain loading should be applied to maintain predictable and driver-intended vehicle movement. In the case of the present embodiment, this requires that the clutch 124K is closed in order to connect the engine 121 to the transmission 124.

If the transmission controller 124C determines that the value of ABSPwrTrnTorqReq is set to 1 or that the value of the PedalPos signal is set to a value greater than a threshold value, the controller 124C determines whether the further conditions are met that there is no fault associated with the TIC function (the TIC function has not assumed fault state S11) and that the value of the signal Input_Shaft_Speed exceeds a prescribed threshold value.

If these conditions are met the transmission controller 124C commands closure of the transmission clutch 124K and the TIC function assumes the inactive state S10. The vehicle therefore assumes state S107. It is to be understood that if a fault condition exists, for example a fault condition preventing closure of the clutch 124K, the TIC function assumes the fault state S11.

In some embodiments the vehicle 100 may have a speed control system such as a cruise control system operable to maintain the vehicle at a prescribed speed when a speed or cruise control mode is selected. When a speed control mode is selected the speed control system is arranged to provide a virtual accelerator pedal position signal VirtuaPedalPosition to the engine controller 121C and transmission controller 124C responsive to which the engine controller 121C determines the amount of torque demanded from the engine 121 by the speed control system.

When a speed control mode is selected, the transmission controller 124C is configured to monitor the signal VirtuaPedalPosition in addition to the signal PedalPos in order to determine when the vehicle 100 may assume state S107. If either signal is set to a value greater than a threshold value in addition to the remaining criteria described above being met the vehicle is configured to assume state S107. Thus the transmission controller 124C may operate on the basis that the VirtuaPedalPosition and PedalPos signals are substantially equivalent.

In some embodiments the speed control system may be operable to accelerate the vehicle 100 from rest when the driver signals release of the brakes by releasing the brake pedal 161. Thus, once the transmission clutch 124K has assumed the closed state and the brakes have been released the cruise control system may provide a torque demand to the engine controller 121C to accelerate the vehicle 100.

In some embodiments the vehicle 100 may have a terrain response (TR) mode in which the vehicle 100 is operable to configure one or more subsystems of the vehicle responsive to a type of terrain over which the vehicle is driving. A terrain response control function of the vehicle 100 (which may be implemented in software code and run on an existing or additional controller) may be arranged to provide a modified or virtual accelerator pedal position signal TMPedalPos when in a TR mode responsive to which the engine controller 121C controls the amount of torque developed by the engine 121. The virtual accelerator pedal position signal may be generated by the TR control function in dependence at least in part on a position of an accelerator pedal 163 and depend on the selected TR mode. For example, in a TR mode optimized for travel over sand, the signal TMPedalPos may be arranged such that an amount of torque demanded of the engine 121 for a given pedal position increases relatively rapidly as a function of pedal position initially, whereas in a TR mode optimized for travel over grass, gravel or snow the signal TMPedalPos may be arranged such that the amount of torque demanded of the engine 121 for a given pedal position increases relatively slowly as a function of pedal position initially. Other arrangements are also useful.

The signal TMPedalPos may be dependent at least in part on a speed of travel of the vehicle 100 and/or a speed of rotation of a portion of a powertrain of the vehicle 100 such as an engine 121. Other arrangements are also useful.

It is to be understood that in embodiments having TR mode functionality the transmission controller 124C may be configured to monitor the signal TMPedalPosition in order to determine when the vehicle may assume state S107. If the signal is set to a value greater than a threshold value in addition to the remaining criteria being met the vehicle 100 may be configured to assume state S107.

It is to be understood that if the TIC function assumes the inactive state S10 from the active state S01 the brake controller 131C is permitted to release the brakes provided the brake pedal 161 has not been depressed since it was released. However if the TIC function does not assume the inactive state S10 the brake controller 131C is not permitted to release the brakes.

It is to be understood that in some embodiments the transmission controller 124C may be operable to generate a clutch state signal having a state corresponding to an actual state of the transmission clutch 124K. In the case of a hydraulic clutch, the clutch state signal may be set in dependence on an amount of hydraulic fluid pressure applied to the clutch 124K to close the clutch 124K. If the pressure exceeds a value corresponding to clutch closure the controller 124C may be arranged to set the clutch state signal to a state corresponding to closure of the clutch 124K. In response to the state of this signal and assuming the remaining conditions described above are also met, the TIC function may be permitted to assume state S10.

In embodiments having an electrically actuated clutch 124K rather than a hydraulically actuated clutch 124K, the transmission controller 124C may be arranged to set the state of the clutch state signal in dependence on the amount of current drawn by the actuator. In some embodiments the clutch state signal may be set to indicate that the clutch is closed if the amount of current drawn exceeds a prescribed value. Provided this condition is met the TIC function may be permitted to assume state S10. Other arrangements are also useful.

It is to be understood that the feature that when the vehicle 100 is in an eco-stop state the brake controller 131C is not permitted to release the brakes unless the TIC function has assumed state S10 has the advantage that a risk of movement of a vehicle 100 in a direction opposite the intended direction of travel (rollback) may be reduced. For example, if the vehicle 100 is stationary on a slope which it is attempting to ascend in a forward direction, a risk that the vehicle moves backwards down the slope under gravity when the brakes are released is reduced.

It is to be understood that the transmission controller 124C provides a signal Input_Shaft_Speed in dependence on the speed of rotation of the input shaft 124KIN of the clutch 124K and that the TIC function is not permitted to assume state S10 if the input shaft 124KIN is not rotating at a speed exceeding a prescribed value. Thus, the brake controller 131C is not permitted to release the brakes. This feature has the advantage that movement of the vehicle 100 in a direction opposite the intended direction may be prevented. For example, in the event that the input shaft 124KIN of the transmission clutch 124K is not rotating (for example due to a failure of the engine 121 to start) the brakes will not be released.

To still further reduce a risk of vehicle movement in the unintended direction, as noted above the transmission controller 124C may generate a clutch state signal confirming the clutch 124K is closed (e.g. in dependence on the amount of hydraulic fluid pressure or actuator current drain) providing further confirmation that the clutch 124K has closed, before the TIC function may assume state S10. Thus in such embodiments state S10 can only be assumed if at least the following conditions are met: the input shaft 124KIN is rotating at a speed exceeding a prescribed threshold; and the transmission clutch state signal confirms that the transmission clutch 124K is closed.

If whilst in state S107 the driver selects the park or neutral mode of the transmission the vehicle 100 is configured to assume state S103.

If whilst in state S107 the transmission controller 124C determines that the value of ABSPwrTrnTorqReq is set to 0 and that the value of PedalPos is less than a threshold value the TIC function is configured to assume active state S01 and the vehicle transitions to state S105. Thus, if the driver has released the accelerator pedal 163 and has initiated braking by means of the brake pedal 161 the transmission controller 124C controls the clutch 124K to open and the engine 121 is controlled by the engine controller 121C to idle at a prescribed idle speed. In some embodiments, the transmission controller 124C controls the clutch 124K to open and the engine 121 is controlled by the engine controller 121C to idle at a prescribed idle speed if the driver releases the accelerator pedal 163 regardless of whether the driver subsequently depresses the brake pedal 161.

It is to be understood that in embodiments having a cruise control mode the transmission controller 124C is also configured to monitor the VirtuaPedalPosition signal in addition to the PedalPos signal when the cruise control mode is selected. In embodiments having a TR mode the transmission controller 124C is configured to monitor the TMPedalPos signal when TR mode is selected. Other arrangements are also useful.

In some embodiments, if the vehicle 100 is in state S107 and the VirtuaPedalPosition signal or TMPedalPos signal correspond to an accelerator pedal position that is less than a threshold value the vehicle 100 may be configured to assume state S105 provided the remaining criteria described above are also met.

In some embodiments, when in state S107 the transmission controller 124C is also configured to monitor a signal corresponding to vehicle speed, such as the value of a parameter or signal VehMovementStatus_HS2. The controller 124C may be configured only to allow the vehicle 100 to transition to state S105 if the signal indicates that the vehicle 100 is stationary provided the remaining criteria described above are also met.

If whilst the vehicle 100 is in state S105 the driver selects the park or neutral mode of the transmission 124 the vehicle transitions to state S103 in which the TIC function assumes state S00 as described above.

If at any time whilst in state S105 the transmission controller 124C determines that one of the following conditions is met, the vehicle 100 is configured to assume a fault state S109 in which the TIC function assumes fault state S11:

(a) the value of Input_Shaft_Speed is less than a threshold value when the value of ABSPwrTrnTorqReq is set to 1; and the further conditions are met that the transmission 124 is in the drive, reverse or sport mode, a value of a timer signal (which is reset when the foregoing conditions are first met) exceeds a threshold value Timeout and a value of the parameter VehMovementStatus_HS2 is zero (indicating the vehicle is stationary);

(b) the value of PedalPos is greater than a threshold value and the further conditions are met that the transmission 124 is in the drive, reverse or sport mode, a value of a timer signal (which is reset when the foregoing conditions are first met) exceeds a threshold value Timeout and a value of a parameter VehMovementStatus_HS2 is zero; and (c) the transmission controller 124C determines that there is a fault associated with the transmission clutch 124K.

It is to be understood that the value of Timeout may be set such that if the respective foregoing conditions are met for a sufficiently long period and the value of the parameter VehMovementStatus_HS2 is zero the vehicle assumes state S109. In some embodiments a signal other than VehMovementStatus_HS2 may be employed by the controller 124C to determine whether the vehicle 100 is stationary.

It is to be understood that condition (a) corresponds to a situation in which the driver is demanding torque in a driving mode of the transmission but the input shaft 124KIN is rotating at a speed less than a threshold speed and the vehicle 100 is still stationary after a prescribed time period has elapsed. Thus the transmission controller 124C determines that this situation does not correspond to one for which the vehicle 100 is exhibiting intended behaviour and the fault state S109 is assumed.

Condition (b) corresponds to a situation in which the driver has released the brake pedal in a driving mode of the transmission 124 and the vehicle 100 is still stationary after a prescribed time period has elapsed.

Embodiments of the present invention have the advantage that a risk that a vehicle having stop/start functionality such as a hybrid electric vehicle or non-hybrid vehicle suffers rollaway in which the vehicle moves in a direction other than the intended direction when initiating motion on an inclined driving surface may be reduced.

In some embodiments, if the transmission clutch 124K fails to close, as determined by reference to a clutch state signal, the brake controller 131C may be prevented from releasing brakes of the vehicle 100 thereby retaining the vehicle 100 in a stationary state.

Similarly, in some embodiments, if the transmission clutch 124K takes a longer period to close than might otherwise be expected, for example due to a relatively low pressure of hydraulic fluid, the transmission controller 124C waits until confirmation of clutch closure has been provided by reference to the clutch state signal before allowing the brakes to be released. Thus, rollaway of the vehicle 100 is prevented during the period for which the transmission clutch 124K is being closed.

It is to be understood that in some embodiments engine stop/start functionality is not provided, but the transmission controller 124C is still arranged to hold the transmission clutch 124K in the open state when the vehicle is held stationary by brakes of the vehicle 100. When the driver signals release of the brakes, the transmission controller 124C controls the transmission clutch 124K to close provided an input shaft of the clutch 124K is rotating at a speed exceeding a prescribed threshold. In some embodiments the transmission controller 124C also verifies that the clutch 124K is closed (by reference to a clutch state signal) before allowing the brakes to be released. If the transmission controller 124C determines that the clutch state signal indicates that the clutch 124K has not closed, the brake controller 131C is prevented from releasing the brakes and the vehicle 100 continues to be held stationary. In some arrangements if the clutch 124K has not closed within a prescribed period of the closure command being issued by the transmission controller 124C the vehicle is configured to assume the failed start condition in which the vehicle 100 continues to be held stationary.

In some embodiments the transmission clutch 124K may be opened and the engine 121 may in certain circumstances be controlled to remain switched on when the vehicle 100 is held stationary, for example if the driver holds the brake pedal 161 depressed. This may for example permit a cabin HVAC (heating, ventilation and air conditioning) system to operate when the vehicle is stationary. In addition or instead the engine 121 may in some circumstances remain switched on in order to recharge a battery of the vehicle 100. For example in the case of a hybrid electric vehicle (HEV), the engine 121 may drive an electric machine in order to generate charge to recharge a battery of the HEV for powering a traction motor. The electric machine may be operable as a generator and as a traction motor in some embodiments.

Embodiments of the present invention may be understood by reference to the following numbered paragraphs:

1. A control system for a vehicle, the vehicle having a powertrain comprising a prime mover and a driveline, the control system being configured selectively to control the driveline to assume a first state in which a transmission of the driveline is substantially fully connected to the prime mover and a second state in which when the vehicle is stationary the transmission is at least partially disconnected or decoupled from the prime mover thereby to reduce a torque loading on the prime mover, the control system being configured to control the driveline to assume the second state when the vehicle is held stationary by brakes of the vehicle in response to actuation of a driver operable brake control device, the control system being operable upon release of the brake control device to verify that a first portion of a powertrain of the vehicle is rotating at a speed exceeding a prescribed threshold and to command the driveline to assume the first state before permitting release of the brakes.

2. A control system as described in paragraph 1 configured wherein if the first portion of the powertrain of the vehicle is not rotating at a speed exceeding the prescribed threshold within a prescribed period of time after release of the brake control device the control system is configured automatically to assume a failed start state in which the vehicle continues to be held stationary.

3. A control system as described in paragraph 2 wherein in the failed start state the control system continues to hold the vehicle stationary at least in part by means of the brakes.

4. A control system as described in paragraph 2 wherein in the failed start state the control system continues to hold the vehicle stationary at least in part by means of a parking brake.

5. A control system as described in paragraph 2 wherein in the failed start state the control system continues to hold the vehicle stationary at least in part by controlling the transmission to assume a park mode.

6. A control system as described in paragraph 1 configured to control the driveline to assume the first state when the brake control device is released and the further condition is met that an amount of torque demanded of the powertrain is greater than a threshold value.

7. A control system as described in paragraph 1 configured to control the driveline to assume the first state in the event an amount of torque demanded of the powertrain is above a threshold value whilst the vehicle is being held stationary by the brakes before the driver releases the brake control device.

8. A control system as described in paragraph 7 wherein the amount of torque demanded of the powertrain is controlled in dependence on one selected from amongst a position of a driver-operated accelerator control device and an output provided by the control system substantially independently of the position of the driver accelerator control device, optionally an output of a vehicle speed control or automatic progress control system.

9. A control system as described in paragraph 1 wherein the brake control device comprises a foot pedal, the system being operable wherein release of the brake control device is identified by reference to an amount of pressure applied to the foot pedal.

10. A control system as described in paragraph 9 operable wherein release of the brake control device is identified by a reduction in an amount of pressure applied to the foot pedal of the vehicle substantially to zero.

11. A control system as described in paragraph 1 operable to control the driveline to assume the first state by substantially fully closing a clutch device and to control the driveline to assume the second state by at least partially opening the clutch device.

12. A control system as described in paragraph 1 operable to generate a driveline state output indicative of whether the driveline is in the first state, the control system being operable to verify that the driveline is in the first state by reference to the driveline state output.

13. A control system as described in paragraph 12 operable to release the brakes upon verification by the control system that the conditions are met that a first portion of a powertrain of the vehicle is rotating at a speed exceeding a prescribed threshold and that the driveline is in the first state, verification that the driveline is in the first state being made by reference to the driveline state output.

14. A control system as described in paragraph 12 configured to control the driveline to assume the first state in the event an amount of torque demanded of the powertrain is above a threshold value whilst the vehicle is being held stationary by the brakes before the driver releases the brake control device, wherein the driveline state output is set in dependence on a state of the clutch device.

15. A control system as described in paragraph 14 wherein the state of the clutch device is determined by reference to one selected from amongst an amount of hydraulic fluid pressure applied to close the clutch device, an amount of electrical current drawn by the clutch device when the clutch device is closed, and an amount of torque transmitted by the clutch device.

16. A control system as described in paragraph 12 wherein the driveline state output is provided in the form of a signal.

17. A control system as described in paragraph 12 wherein the output is provided in the form of a value of a variable or a state of a flag stored in a memory of the system.

18. A control system as described in paragraph 1 configured to verify that a first portion of a powertrain of the vehicle is rotating at a speed exceeding a prescribed threshold by verifying that a drive portion of the prime mover is rotating at a speed exceeding the prescribed threshold.

19. A control system as described in paragraph 18 operable to determine that the drive portion of the prime mover is rotating by reference to a speed of rotation of a component to which the drive portion of the prime mover is connected.

20. A control system as described in paragraph 19 operable to control the driveline to assume the first state by substantially fully closing a clutch device and to control the driveline to assume the second state by at least partially opening the clutch device, the system being operable to determine that the drive portion of the prime mover is rotating by reference to a speed of rotation of an input portion of the clutch device.

21. A control system as described in paragraph 1 operable to release the brakes when the further condition is met that the driveline is verified to be in the first state.

22. A control system as described in paragraph 1 operable to control the vehicle to assume a failed move state in which brakes of the vehicle are applied in order to stop movement of the vehicle if the driver releases the brake control device and a speed of the vehicle does not exceed a prescribed value within a prescribed period of the driver releasing the brake control device.

23. A control system as described in paragraph 1 operable to determine that the brake control device has been released when the amount of brake torque demanded by in response to application of the brake control device is below a prescribed value.

24. A control system as described in paragraph 23 wherein the prescribed value of brake torque demanded by the brake control device corresponds to an amount of brake torque required to maintain the vehicle substantially stationary.

25. A vehicle comprising a control system as described in paragraph 1.

26. A vehicle as described in paragraph 25 wherein the driver-operated brake control device comprises a foot pedal operable to apply the brakes when pressure is applied to the foot pedal.

27. A vehicle as described in paragraph 25 wherein the amount of torque demanded of the powertrain is controlled in dependence on one selected from amongst a position of a driver-operated accelerator control device and an output provided by the control system substantially independently of the position of the driver accelerator control device, optionally an output of a vehicle speed control or automatic progress control system, and wherein the driver-operated accelerator control comprises a foot pedal.

28. A vehicle as described in paragraph 25 wherein the prime mover comprises an engine.

29. A vehicle as described in paragraph 25 wherein the prime mover comprises an electric motor.

30. A vehicle as described in paragraph 28 wherein the prime mover comprises an engine and an electric motor.

31. A vehicle as described in paragraph 25 wherein the control system is operable to control the driveline to assume the first state by substantially fully closing a clutch device and to control the driveline to assume the second state by at least partially opening the clutch device, wherein the transmission comprises the clutch device.

32. A method of controlling a motor vehicle by means of a control system, the vehicle having a powertrain comprising a prime mover and a driveline, the method comprising selectively controlling the driveline to assume a first state in which a transmission of the driveline is substantially fully connected to the prime mover and a second state in which the transmission is at least partially disconnected or decoupled from the prime mover thereby to reduce a torque loading on the prime mover, the method comprising controlling the driveline to assume the second state when the vehicle is held stationary by brakes of the vehicle in response to actuation of a driver operable brake control device, the method comprising, upon release of the brake control device by the driver, maintaining the vehicle stationary by the brakes and controlling the driveline to assume the first state, the method further comprising verifying that a first portion of a powertrain of the vehicle is rotating at a speed exceeding a prescribed threshold after release of the brake control device before permitting release of the brakes.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A control system for a vehicle, the vehicle having a powertrain comprising a prime mover and a driveline,
    the control system being configured to control the driveline to place the driveline into one of a first state and a second state, in the first state a transmission of the driveline is substantially fully connected to the prime mover, in the second state the transmission is at least partially disconnected or decoupled from the prime mover when the vehicle is stationary thereby to reduce a torque loading on the prime mover, the control system being configured to place the driveline into the second state when the vehicle is held stationary by at least one brake in response to actuation of a driver operable brake control,
    the control system being operable upon release of the brake control to verify that a first portion of a powertrain of the vehicle is rotating at a speed exceeding a prescribed threshold and to place the driveline into the first state before permitting release of the brake;
    wherein the control system is operable to control the driveline to place the driveline into the first state by substantially fully closing a clutch and to control the driveline to place the driveline into the second state by at least partially opening the clutch.

2. A control system as claimed in claim 1, wherein if the first portion of the powertrain of the vehicle is not rotating at the speed exceeding the prescribed threshold within a prescribed period of time after release of the brake control the control system is configured automatically to assume a failed start state in which the vehicle continues to be held stationary.

3. A control system as claimed in claim 2, wherein in the failed start state the control system continues to hold the vehicle stationary at least in part by the brake.

4. A control system as claimed in claim 2, wherein in the failed start state the control system continues to hold the vehicle stationary at least in part by a parking brake.

5. A control system as claimed in claim 2, wherein in the failed start state the control system continues to hold the vehicle stationary at least in part by controlling the transmission to place the transmission in a park mode.

6. A control system as claimed in claim 1, wherein the control system is configured to control the driveline to place the driveline into the first state when the brake control is released and a further condition is met that an amount of torque demanded of the powertrain is greater than a threshold value.

7. A control system as claimed in claim 1, wherein the control system is configured to control the driveline to place the driveline into the first state in the event an amount of torque demanded of the powertrain is above a threshold value while the vehicle is being held stationary by the brake before the driver releases the brake control.

8. A control system as claimed in claim 7, wherein the amount of torque demanded of the powertrain is controlled in dependence on at least one of:
    a position of a driver-operated accelerator control,
    an output provided by the control system substantially independently of the position of the driver accelerator control, and
    an output of a vehicle speed control.

9. A control system as claimed in claim 1, wherein release of the brake control is identified by reference to an amount of pressure applied to a foot pedal of the vehicle.

10. A control system as claimed in claim 9, wherein release of the brake control is identified by a reduction in an amount of pressure applied to the foot pedal of the vehicle substantially to zero.

11. A control system as claimed in claim 1, wherein the control system is operable to generate a driveline state output indicative of whether the driveline is in the first state, the control system being operable to verify that the driveline is in the first state by reference to the driveline state output.

12. A control system as claimed in claim 11, wherein the control system is operable to release the brake upon verification by the system that the first portion of the powertrain of the vehicle is rotating at a speed exceeding the prescribed threshold and that the driveline is in the first state, verification that the driveline is in the first state being made by reference to the driveline state output.

13. A control system as claimed in claim 11, wherein the driveline state output is set in dependence on a state of a clutch.

14. A control system as claimed in claim 13, wherein the state of the clutch is determined by reference to at least one of an amount of hydraulic fluid pressure applied to close the clutch, an amount of electrical current drawn by the clutch when the clutch is closed, and an amount of torque transmitted by the clutch.

15. A control system as claimed in claim 11, wherein the driveline state output is provided in the form of a signal.

16. A control system as claimed in claim 11, wherein the output is provided in the form of a value of a variable or a state of a flag stored in a memory of the system.

17. A control system as claimed in claim 1, wherein the control system is configured to verify that the first portion of the powertrain of the vehicle is rotating at the speed exceeding the prescribed threshold by verifying that a drive portion of the prime mover is rotating at the speed exceeding the prescribed threshold.

18. A control system as claimed in claim 17, wherein the control system is operable to determine that the drive portion of the prime mover is rotating by reference to a speed of rotation of a component to which the drive portion of the prime mover is connected.

19. A control system as claimed in claim 18, wherein the control system is operable to determine that the drive portion of the prime mover is rotating by reference to a speed of rotation of an input portion of a clutch.

20. A control system as claimed in claim 1, wherein the control system is operable to release the brake when the further condition is met that the driveline is verified to be in the first state.

21. A control system as claimed in claim 1, wherein the control system is operable to control the vehicle to assume a failed move state in which the brake is applied in order to stop movement of the vehicle if the driver releases the brake control and a speed of the vehicle does not exceed a prescribed value within a prescribed period of the driver releasing the brake control.

22. A control system as claimed in claim 1, wherein the control system is operable to determine that the brake control has been released when the amount of brake torque demanded in response to application of the brake control is below a prescribed value.

23. A control system as claimed in claim 22, wherein the prescribed value of brake torque demanded by the brake control corresponds to an amount of brake torque required to maintain the vehicle substantially stationary.

24. A vehicle comprising
a powertrain including a prime mover and a driveline; and
a control system,
the control system being configured to control the driveline to place the driveline into one of a first state and a second state, in the first state a transmission of the driveline is substantially fully connected to the prime mover, in the second state the transmission is at least partially disconnected or decoupled from the prime mover when the vehicle is stationary thereby to reduce a torque loading on the prime mover, the control system being configured to control the driveline to place the driveline into the second state when the vehicle is held stationary by at least one brake in response to actuation of a driver operable brake control,
the control system being operable upon release of the brake control to verify that a first portion of a powertrain of the vehicle is rotating at a speed exceeding a prescribed threshold and to place the driveline into the first state before permitting release of the brake;
wherein the control system is operable to control the driveline to place the driveline into the first state by substantially fully closing a clutch and to control the driveline to place the driveline into the second state by at least partially opening the clutch.

25. A vehicle as claimed in claim 24, wherein the driver-operated brake control comprises a foot pedal operable to apply the brake when pressure is applied to the foot pedal.

26. A vehicle as claimed in claim 24, wherein the prime mover comprises an engine.

27. A vehicle as claimed in claim 24, wherein the prime mover comprises an electric motor.

28. A vehicle as claimed in claim 24, wherein the prime mover comprises an engine and an electric motor.

29. A method of controlling a motor vehicle having a powertrain comprising a prime mover and a driveline,
the method comprising:
selectively controlling the driveline to place the driveline into a first state in which a transmission of the driveline is substantially fully connected to the prime mover or a second state in which the transmission is at least partially disconnected or decoupled from the prime mover thereby to reduce a torque loading on the prime mover,
controlling the driveline to place the driveline into the second state by at least partially opening a clutch when the vehicle is held stationary by a brake by actuation of a driver operable brake control;
upon release of the brake control, maintaining the vehicle stationary by the brake and controlling the driveline to place the driveline into the first state by substantially fully closing the clutch; and
verifying that a first portion of the powertrain is rotating at a speed exceeding a prescribed threshold after release of the brake control before permitting release of the brake.

30. A control system for a vehicle, the vehicle having a powertrain comprising a prime mover and a driveline,
the control system being configured to control the driveline to place the driveline into one of a first state and a second state, in the first state a transmission of the driveline is substantially fully connected to the prime mover, in the second state the transmission is at least partially disconnected or decoupled from the prime mover when the vehicle is stationary thereby to reduce a torque loading on the prime mover, the control system being configured to place the driveline into the second state when the vehicle is held stationary by at least one brake in response to actuation of a driver operable brake control,
the control system being operable upon release of the brake control to verify that a first portion of a powertrain of the vehicle is rotating at a speed exceeding a prescribed threshold and to place the driveline into the first state before permitting release of the brake;
wherein the control system is operable to generate a driveline state output indicative of whether the driveline is in the first state, the control system being operable to verify that the driveline is in the first state by reference to the driveline state output; and
wherein the driveline state output is set in dependence on a state of a clutch.

31. A control system as claimed in claim 30, wherein the state of the clutch is determined by reference to at least one of an amount of hydraulic fluid pressure applied to close the clutch, an amount of electrical current drawn by the clutch when the clutch is closed, and an amount of torque transmitted by the clutch.

* * * * *